United States Patent Office 3,179,497
Patented Apr. 20, 1965

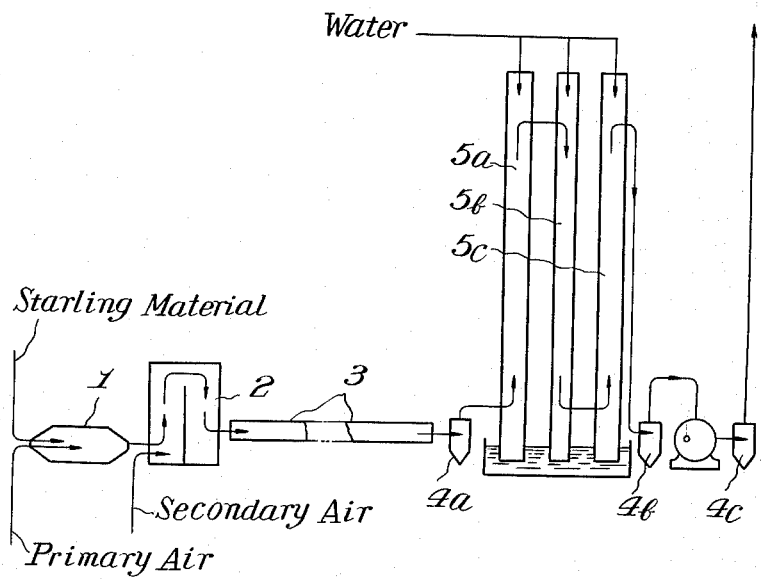

3,179,497
PRODUCTION OF SELENIUM OXIDE, TELLURIUM OXIDE OR MIXTURE THEREOF
Kenjiro Yanagase, 2150 Mukoyama, Fukuma-machi, Munakata-gun, Fukuoka-ken, Japan
Filed Apr. 17, 1961, Ser. No. 103,561
13 Claims. (Cl. 23—139)

This invention relates to a process of treating sulfur-selenium-tellurium-bearing materials to produce selenium oxide, tellurium oxide or a mixture thereof, or of treating sulfur-selenium-bearing materials to produce selenium oxide.

Selenium oxide has been generally recovered from copper refinery slimes, the dust obtained at sulfuric acid plant or the slimes from cyanide process for gold and silver, and tellurium oxide has been obtained by using copper refinery slimes as a raw material. However, the material containing selenium, tellurium and elemental sulfur or materials containing selenium and elemental sulfur involved in the present invention have not been used as starting materials for producing selenium oxide or tellurium oxide. These materials containing substantial amounts of elemental sulfur may be employed only with low ultimate recovery according to the conventional wet-methods. The process of treating such materials to produce selenium oxide and tellurium oxide by oxidizing burning with air has not been heretofore investigated to any great extent, and no attempt aiming at commercial production has been made yet because of the difficulties arising from the large amount of $SO_2$ gas produced, which has a strong reducing power for selenium oxide and tellurium oxide formed. Very few papers concerned with the burning of elemental sulfur-bearing materials have been published, and of these only one has reported that the burning of materials containing selenium and elemental sulfur with pure oxygen resulted in producing a small amount of selenium oxide with elemental selenium.

It is an essential object of the present invention to provide a commercially feasible process for treating materials bearing elemental sulfur, selenium, and tellurium to produce selenium oxide, tellurium oxide, or a mixture thereof and of treating materials bearing elemental sulfur and selenium to produce selenium oxide.

Generally speaking, the present invention contemplates a process for the production of selenium oxide, tellurium oxide and mixtures thereof from selenium and tellurium bearing sulfur and sulfur slimes as starting material, by adjusting the water content of the starting material to between about 2% to about 10%, feeding this starting material into a first combustion chamber and burning it at a temperature of above 500° C. using air, air enriched with oxygen or pure oxygen, leading the resultant gases into a second combustion chamber with an additional supply of oxidizing gas, and then into condensing equipment where selenium oxide, tellurium oxide or their mixtures are recovered from portions of the equipment maintained at above 70° C., the elemental sulfur, selenium and tellurium being recovered in portions of the equipment wherein the temperature is below 70° C. The elemental sulfur, selenium, tellurium mixtures obtained in this first treatment are again used as starting material and reprocessed a second time.

The sole figure is a schematic diagram of the apparatus used in connection with the accompanying examples described herein.

The present inventor has found the following facts through a number of experiments relating to the case when material containing selenium, tellurium and elemental sulfur or materials containing selenium and elemental sulfur are burned with air, air enriched with oxygen or oxygen alone, and the resulting gases are introduced into condensers and then into dust collecting equipment where they are cooled slowly.

(a) When said materials are burned with air, air enriched with oxygen or oxygen alone without eliminating the moisture involved, and the resulting gases are then introduced into condensers, crystalline selenium oxide or a mixture of crystalline selenium oxide and tellurium oxide is found only in parts of the equipment at a temperature above about 70° C., while no oxide deposit is observed in other parts below about 70° C. It was also found that very little elemental sulfur, selenium or tellurium is contained in the oxide, whereas a mixture of elemental sulfur, selenium and tellurium with no oxide formed is recovered at various parts below about 70° C. in the condensers and dust collecting equipment. Elemental selenium and tellurium have never been obtained in any part above about 70° C.

(b) The selenium and tellurium contents in the starting material have effects on the recovery of the crystalline selenium oxide and tellurium oxide. If the selenium content exceeds 3.3% or tellurium content exceeds 1.4% in the starting material, parts of the selenium and tellurium included are converted into selenium oxide and tellurium oxide, respectively, and recovered in the condensers above about 70° C., and the residual selenium or tellurium is recovered as elemental selenium, tellurium or their mixture at the parts of condensers below about 70° C. and in the dust collecting equipment. On the other hand, if the selenium content is less than 3.3%, and tellurium is less than 1.4%, no oxide deposit is found above about 70° C., but the selenium and tellurium in the starting materials are recovered in elemental forms at that part below about 70° C.

(c) According to this method, air, or air enriched with oxygen, or pure oxygen is used for burning without eliminating moisture. The starting materials employed also contain some water, so that the water usually coexists with $SO_2$ gas produced, giving no appreciable effect or reducing reaction on the formation of crystalline selenium oxide or tellurium oxide obtained by slow cooling at those parts above about 70° C.

(d) If completely dried materials containing selenium, tellurium and elemental sulfur or those containing selenium and elemental sulfur were employed with thoroughly dried air, or air enriched with oxygen, or pure oxygen for accomplishing the said burning, no such separate deposit of the oxides from the elemental materials according to the temperature gradient would be observed. Rather, deposits containing elemental sulfur, selenium or tellurium and consisting chiefly of their oxides would be obtained from all parts of the apparatus. The conditions for obtaining these oxides do not depend on the concentrations of selenium and tellurium in the starting materials unlike the case given in (b), but oxide deposits with elemental sulfur, selenium or tellurium are formed.

(e) In order to finally obtain deposits of oxide and elements in the elemental state at those parts above and below about 70° C. as mentioned before, the starting materials should have a water content from 2% to 10%. The air, or air enriched with oxygen, or pure oxygen used for burning need not be free of moisture. The concentration of elemental sulfur in the starting materials should be more than 30%.

(f) During the operation care must be taken to achieve complete combustion of the starting material so that the second combustion chamber may not contain any elemental mixture of sulfur, selenium and tellurium. No matter what complete combustion may be tried at the initial stage of the operation, when the temperature in the second combustion chamber will not be high enough to maintain complete combustion, the elemental sulfur, selenium and tellurium are found at parts below about 70° C. as a result of incomplete burning of the starting materials. The amount of elemental sulfur, selenium and tellurium obtained at the starting time are usually pretty small.

In summary, the reason why oxides are not formed below about 70° C. in the oxidizing burning may be considered to be that the selenium oxide or tellurium oxide is reduced by the $SO_2$ gas produced in the presence of condensed water with a small amount of $H_2SO_4$ resulting from cooling of the gas. When such raw materials as the slimes from the cyanide process, having no elemental sulfur and consequently giving no $SO_2$ gas, are burned alone using air, without eliminating its moisture, selenium oxide is usually obtained even at parts near room temperature instead of separate deposition of oxide and elements in the elemental state according to the temperature difference. Since selenium oxide has the property of absorbing moisture to a great extent, a syrup-like solution is found at those parts at low temperature.

The material containing selenium, tellurium and elemental sulfur involved in this invention as starting materials may be, for example, obtained at a sulfur-dioxide plant. These materials are usually found deposited at such places as inner parts of condensers and various pipes or on the surface of a fan, when $SO_2$ gas produced by burning elemental sulfur (especially volcanic sulfur) is cooled down to near the room temperature through the condensers. The compositions of these deposits obtained depend on the original concentration of selenium and tellurium in the sulfur, the manner of treatment or the deposited places. A few examples showing the results of chemical analysis of the deposits are as follows:

| Sample No. | Se, percent | Te, percent | Elemental S, percent | $H_2O$, percent | Ignition residue, percent |
|---|---|---|---|---|---|
| 1 | 2.1 | 0.5 | 74.4 | 5.0 | 16.1 |
| 2 | 8.6 | 2.0 | 77.5 | 1.6 | 8.9 |
| 3 | 0.2 | 0.1 | 88.1 | 0.4 | 10.7 |

In the practice of this invention, materials containing selenium but having very low or zero content of both tellurium and sulfur, such as the sulfuric-acid plant dust recovered at the various parts of the cleaning apparatus for $SO_2$ gas of a plant producing sulfuric acid by roasting sulfide ore, may be mixed beforehand with elemental sulfur or material containing elemental sulfur material, and the mixture may be used successfully as a starting material for producing selenium oxide.

The starting materials are burned with air, or air enriched with oxygen, or pure oxygen without eliminating moisture after the water content has been adjusted from 2% to 10% in the said materials by adding water, if necessary. By this process as will be hereinafter explained the crystalline oxide deposits are eventually recovered at those parts of the equipment where the temperature is above about 70° C. in the condenser system. A mixture of elemental sulfur and selenium or a mixture of elemental sulfur, selenium, and tellurium is also obtained at those parts of the equipment where the temperature is below about 70° C. at the same time. The concentrations of both selenium and tellurium in the elemental mixtures are, of course, higher than those in the starting materials. The selenium or tellurium content in the materials containing elemental sulfur available for the present process is generally low, so that it is quite difficult to convert all of the selenium and tellurium contained in the starting materials to oxides by only a single burning treatment with rich recovery. In order to overcome this difficulty, the elemental deposits recovered by the first treatment may be again treated in the same way by what is here called the second treatment. The resulting oxides are recovered, and the elemental deposits obtained then will be further treated as before in the third treatment. Thus the deposits containing elemental selenium or tellurium obtained by each treatment which is repeated once or more are further burned and recovered in the succeeding treatment.

In accordance with the present invention, selenium-tellurium-bearing materials without elemental sulfur are mixed beforehand with elemental sulfur or elemental sulfur-bearing materials, and then may be treated as a starting material. A starting material with a small amount of elemental sulfur or large amount of ignition redue used in the present invention is inferior to that of a higher concentration of sulfur with respect to the ignition and self-burning properties. Consequently, indirect heating from outside the furnace may be applied for the treatment of low elemental sulfur materials, but as a preferable method, materials high in elemental sulfur content may be mixed with an appropriate amount of low elemental sulfur materials and fed into the furnace so as to attain prompt increase of furnace temperature and, at the same time, to maintain the temperature sufficiently to accomplish complete burning through the good ignition and self-burning properties of elemental sulfur. Consequently, the lowering of the furnace temperature caused by adding starting materials may also be corrected quickly. This process, therefore, can make the oxidizing burning of elemental sulfur, selenium and tellurium in the starting materials much easier, more certain and more rapid with the added advantage of a saving in fuel consumption needed for heating the furnace.

The specific and detailed steps of the process hereinabove mentioned will become more apparent from the following examples:

*Example 1*

Five hundred kilograms of a starting material containing 2.1% selenium, 0.5% tellurium, 5.0% $H_2O$ and 74.4% elemental sulfur with 16.1% ignition residue, was fed at a rate of 30 to 40 kilograms per hour into a furnace 1 (150 liters by volume) made of cast iron. At first, the furnace was heated with the use of an air blast without eliminating moisture. The resulting gases were mixed with secondary air in a second burning or oxidizing chamber 2 made of fire clay bricks at the exit of which the temperature was maintained above 500° C. The gases discharged from the said exit were then introduced into the pipe condensers 3. During this operation, complete burning was maintained by adjusting the feeding rate of the starting materials and the flow rates of primary and secondary air. The condensers were composed of horizontal iron pipes, 0.3 m. in diameter and 15 m. in length, and the gases produced were gradually cooled as they passed through the said pipes. Mixtures of elemental selenium, tellurium and sulfur were recovered at parts below about 70° C. in the condensers and also in the various succeeding equipment. As seen in the figure, the gases produced passed through the apparatus in the sequence of: a cyclone 4a, water scrubbers 5a, 5b, and 5c, another cyclone 4b, a fan, a cyclone 4c, and then to a stack. During this process, selenium oxide and tellurium oxide did not deposit on those parts above about 70° C. in the condenser 3. Nor did elemental selenium and tellurium deposit there. The selenium tellurium bearing materials obtained by the first treatment contained 35.0% selenium, 8.2% tellurium and 54.1% sulfur, and the total weight was 27.4 kilograms. The materials obtained were then mixed with 25.0 kilograms of material containing 0.2% selenium, 0.1% tellurium and 86.2% elemental sulfur, 2.7 kilograms of water were added, and the same treatment was repeated with this mixture. As a result of the second treatment, 15.4 kilograms of a mixture of crystalline selenium oxide and tellurium oxide was recovered at those parts above about 70° C. in the condensers. This mixture had the following analysis: 53.9% selenium, 12.3% tellurium, 5.2% water, 1.3% residue insoluble in HCl and substantially free of elemental sulfur, selenium and tellurium. On the other hand, at those parts below 70° C. in the condensers as well as in the various succeeding equipment, 0.8 kilogram of the mixture consisting of elemental sulfur, selenium and tellurium was obtained in this second treatment and had the following analysis: 71.4% selenium, 14.0% tellurium and 5.7% sulfur.

*Example 2*

In this case, 100 kilograms of a starting material containing 8.6% selenium, 2.0% tellurium, 77.5% elemental sulfur, 1.6% water and 8.9% ignition residue was mixed with 5.0 kilograms of water and treated by the same process as described in Example 1. In the first treatment, parts of selenium and tellurium were recovered as a selenium oxide and tellurium oxide, respectively, at those parts above about 70° C. in the condensers because of the fairly high content of both selenium and tellurium present in the starting material. This oxide was 1.5 kilograms in weight and had the following analysis: 54.2% selenium, 13.3% tellurium, 4.6% water and 1.0% residue insoluble in HCl. 10.5 kilograms of a mixture containing elemental sulfur, selenium and tellurium was also obtained from those parts below about 70° C. in the condensers and in the various succeeding equipment. As a result of analysis, the mixture was found to have the following composition in the dry state: 67.6% selenium, 15.4% tellurium and 14.3% elemental sulfur. As seen above, when a starting material high in both selenium and tellurium contents was used, a mixture of selenium oxide and tellurium oxide was recovered from those parts above about 70° C. in the first treatment, and at the same time, a mixture of elemental sulfur, selenium and tellurium was obtained from those parts below about 70° C. 10.5 kilograms of the latter mixture was then mixed with 11.0 kilograms of a material containing 0.2% selenium, 0.1% tellurium and 86.2% sulfur. After adding 1.1 kilograms of water, the mixture was treated by the same process as the first one. In the second treatment, 11.9 kilograms of a mixture consisting of crystalline selenium oxide and tellurium oxide was obtained and found to have the following analysis: 54.6% selenium, 12.6% tellurium, 5.5% water and 0.9% residue insoluble in HCl. At the same time, 0.1 kilogram of a mixture consisting of elemental sulfur, selenium and tellurium was recovered from those parts below about 70° C. in the condensers and in the various subsequently used equipments.

*Example 3*

In this instance, a single batch of 1000 kilograms of starting material containing 0.2% selenium, 0.1% tellurium, 88.1% sulfur, 0.4% $H_2O$ and 10.7% ignition residue was mixed with 30 kilograms of water and treated alone by the same process as described in Example 1. After the first treatment, 66.8 kilograms of a mixture consisting of elemental sulfur, selenium and tellurium was recovered and found to have the following analysis: 2.7% selenium, 1.3% tellurium, 89.6% sulfur and 4.5% water. As for the second treatment, this mixture alone was burned in the same process as the first treatment, and 3.3 kilograms of a mixture consisting of elemental sulfur, selenium and tellurium was recovered, which was found to have the following analysis: 50.6% selenium, 23.9% tellurium, 17.1% sulfur and 6.1% water. In the succeeding third treatment, 3.3 kilograms of the mixture obtained in the second treatment was mixed with 5.0 kilograms of elemental sulfur-selenium-tellurium-bearing materials having the composition of 0.2% selenium, 0.1% tellurium and 88.1% sulfur. After adding 0.3 kilograms of water, the same treatment was used and resulted in 3.2 kilograms of a mixture consisting of selenium oxide and tellurium oxide, having the following analysis: 45.7% selenium, 21.8% tellurium, 5.0% water and 1.0% residue insoluble in HCl being obtained. At the same time, 0.1 kilogram of a mixture consisting of elemental sulfur, selenium and tellurium was recovered from those parts below about 70° C.

*Example 4*

In a case where sulfuric acid is produced from sulfide ores, dust with much selenium and very low concentrations of both tellurium and elemental sulfur may be recovered in the $SO_2$ gas cleaning equipment. Such dust may be mixed beforehand with elemental sulfur or elemental sulfur-bearing materials and used as a starting material to produce selenium oxide by the application of this invention. 30 kilograms of the dust containing 0.1% elemental sulfur, 0.06% tellurium, 7.7% selenium and 9.0% water, which was obtained in a mist cottrel at a sulfuric acid plant, were mixed with 60 kilograms of elemental sulfur and 1.5 kilograms of water and treated as described in Example 1. As a result of the first treatment, 4.8 kilograms of a mixture consisting of elemental sulfur and selenium was obtained from those parts below about 70° C. and found to have the following analysis: 43.9% selenium, 51.8% sulfur and 3.3% water. On the other hand, no deposit was found in those parts above about 70° C. The resulting materials were mixed with 7.0 kilograms of elemental sulfur and 0.5 kilogram of water, and then treated as before. 2.7 kilograms of crystalline selenium oxide was obtained from those parts above about 70° C. and found to have the following analysis: 66.4% selenium, 4.2% water and 1.1% residue insoluble in HCl. At the same time, 0.1 kilogram of a mixture consisting of elemental sulfur and selenium was recovered from those parts below about 70° C.

*Example 5*

At first, 100 kilograms of starting materials containing 2.5% selenium, 92.9% elemental sulfur and 3.5% water was alone burned with primary and secondary supply of air, without eliminating moisture, containing about 40% of oxygen by volume. 3.7 kilograms of a mixture consisting of elemental sulfur and selenium, containing 62.8% selenium and 33.7% sulfur, was obtained from those parts below about 70° C. in the condensers and in the various subsequently used equipments. This mixture was then mixed with 4.0 kilograms of sulfur and 0.3 kilogram of water and was treated as before. As a result of the second treatment 3.1 kilograms of crystalline selenium oxide was obtained, and found to contain 65.5% selenium and 2.6% water. At the same time, 0.2 kilogram of a mixture of elemental sulfur and selenium was recovered from that portion below about 70° C.

Since it is obvious that many changes and modifications can be made in the above-described details without departing from the nature and spirit of the invention, it is to be understood that the invention is not to be limited merely to those examples described herein, except as set forth in the appended claims.

What is claimed is:

1. In the production of crystalline selenium oxide from material containing elemental sulfur and selenium, the process which comprises adjusting the water content to between about 2% to 10% in the starting material, feeding said starting material into a first combustion chamber and burning it at a temperature above about 500° C. in the presence of an oxygen rich oxidizing gas, leading the resultant products into a second combustion chamber likewise maintained at a temperature above about 500° C. in the presence of an oxygen rich oxidizing gas where any sulfur and selenium present in said resultant products are further oxidized, then leading the output from said second combustion chamber into condensers having outlets maintained at a temperature of above about 70° C., the selenium oxide being recovered from said outlets, recovering a mixture of elemental sulfur and selenium from succeeding dust collecting equipment having outlets maintained at a temperature below about 70° C., and subjecting any elemental sulfur and selenium mixture obtained in said first treatment to a second treatment carried out by the process of said first treatment, the concentration of the elemental sulfur and selenium in the starting material fed into the first combustion zone in each treatment being respectively more than about 30% by weight and at least about 3.3% by weight.

2. The process of claim 1, wherein the concentration of elemental selenium in the starting material fed into the first combustion zone is less than 3.3% by weight and the only product recovered from said treatment is elemental selenium which is recovered at said outlets maintained at a temperature below 70° C., said elemental selenium so recovered being then added to a new batch of starting material to increase the concentration thereof to at least about 3.3% elemental selenium by weight.

3. The process of claim 1 wherein the resulting gases led into the condensers from the second combustion chamber contain substantial amounts of $SO_2$, a trace of $SO_3$, volatilized $SeO_2$ and water vapor from the starting material and oxygen rich oxidizing gas.

4. The process of claim 1 wherein the elemental sulfur in the material recovered from said outlets maintained at below about 70° C. is obtained from vaporized sulfur resulting from incomplete oxidizing burning in said first and second combustion chambers.

5. The process of claim 1 wherein the elemental selenium in the material recovered from said outlets maintained at below about 70° C. is produced from the reduction of $SeO_2$ by $SO_2$ in the presence of water during the oxidation which takes place in the course of said process.

6. The process of claim 1 wherein the oxygen rich oxidizing gas is air.

7. The process of claim 1 wherein the oxygen rich oxidizing gas is an oxygen-enriched air.

8. The process of claim 1 wherein the elemental sulfur and selenium mixture obtained in the second treatment is subjected to a third treatment carried out by the process of the first treatment.

9. In the production of crystalline selenium oxide and tellurium oxide from a material containing elemental sulfur, selenium and tellurium, the process which comprises adjusting the water content to between about 2% to 10% in the starting material, feeding said starting material into a first combustion chamber and burning it at a temperature above about 500° C. in the presence of an oxygen rich oxidizing gas, leading the resultant products into a second combustion chamber likewise maintained at a temperature above about 500° C. in the presence of an oxygen rich oxidizing gas where any sulfur, selenium and tellurium present in said resultant products are further oxidized, then leading the output from said second combustion chamber into condensers having outlets maintained at a temperature above about 70° C., the selenium oxide and tellurium oxide being recovered from said outlets, recovering elemental sulfur, selenium and tellurium from succeeding dust collecting equipment having outlets maintained at a temperature below about 70° C., and subjecting the elemental sulfur, selenium and tellurium so recovered to a second treatment carried out by the process of the first treatment, the concentration of the elemental sulfur in the starting material fed into the furnace in each treatment being more than about 30% by weight, and the concentrations of the elemental selenium and tellurium in the starting materials fed into the first combustion zone in each treatment being respectively at least about 3.3% and 1.4% by weight.

10. The process of claim 9, wherein the concentration of selenium and tellurium in the starting materials fed into the first combustion zone is less than about 3.3% and 1.4% by weight respectively, and the only product recovered from said treatment is elemental selenium and tellurium which are recovered at said outlets maintained at a temperature below about 70° C., said elemental selenium and tellurium so recovered being then added to a new batch of starting materials to increase the concentration thereof to at least about 3.3% and 1.4% elemental selenium and tellurium respectively, by weight.

11. The process of claim 9 wherein the resulting gases led into the condensers from said second combustion chamber contain a substantial amount of $SO_2$, a trace of $SO_3$, volatilized $SeO_2$ and $TeO_2$, and water vapor from the starting material and oxygen rich oxidizing gas.

12. The process of claim 9 wherein the elemental selenium and tellurium in the material recovered from said outlets maintained at a temperature below about 70° C. are produced from the reduction of $SeO_2$ and $TeO_2$ by $SO_2$ in the presence of water during the oxidation which takes place in the course of said process.

13. The process of claim 9 wherein any elemental sulfur, selenium and tellurium obtained in said second treatment is subjected to a third treatment carried out by the process of said first treatment.

References Cited by the Examiner

UNITED STATES PATENTS

| | | | |
|---|---|---|---|
| 2,039,256 | 4/36 | Martin | 23—209 |
| 2,775,509 | 12/56 | Lebedeff et al. | 23—139 |
| 2,948,591 | 8/60 | Handwerk et al. | 23—139 |

OTHER REFERENCES

Mellor: Comprehensive Treatise on Inorganic and Theoretical Chemistry, Longmans, Green and Co., New York, vol. X, page 811, 1930.

MAURICE A. BRINDISI, *Primary Examiner.*